Nov. 30, 1965    V. C. CRITES    3,220,942
METHOD OF CONTROLLING ELECTRICAL PROPERTIES
OF THE SUB-SURFACE METALLIC STRUCTURE
OF OIL AND GAS WELLS
Filed Jan. 19, 1960    6 Sheets-Sheet 1

INVENTOR.
VIRGIL C. CRITES

Nov. 30, 1965

V. C. CRITES

3,220,942

METHOD OF CONTROLLING ELECTRICAL PROPERTIES
OF THE SUB-SURFACE METALLIC STRUCTURE
OF OIL AND GAS WELLS

Filed Jan. 19, 1960

INVENTOR.
VIRGIL C. CRITES

Fig. 4.

INVENTOR.
VIRGIL C. CRITES

Fig. 6.

Nov. 30, 1965  V. C. CRITES  3,220,942
METHOD OF CONTROLLING ELECTRICAL PROPERTIES
OF THE SUB-SURFACE METALLIC STRUCTURE
OF OIL AND GAS WELLS
Filed Jan. 19, 1960  6 Sheets-Sheet 5

INVENTOR.
VIRGIL C. CRITES

Nov. 30, 1965    V. C. CRITES    3,220,942
METHOD OF CONTROLLING ELECTRICAL PROPERTIES
OF THE SUB-SURFACE METALLIC STRUCTURE
OF OIL AND GAS WELLS
Filed Jan. 19, 1960    6 Sheets-Sheet 6

INVENTOR.
VIRGIL C. CRITES

United States Patent Office 3,220,942
Patented Nov. 30, 1965

3,220,942
METHOD OF CONTROLLING ELECTRICAL PROPERTIES OF THE SUB-SURFACE METALLIC STRUCTURE OF OIL AND GAS WELLS
Virgil C. Crites, Los Angeles, Calif., assignor to Lucile Wells Crites, Los Angeles, Calif.
Filed Jan. 19, 1960, Ser. No. 3,443
18 Claims. (Cl. 204—147)

This application is a continuation, in part, of my pending application No. 720,805 filed March 6, 1958, entitled, "Method of Preventing Corrosion in Subterranean Structures," now abandoned.

This invention relates particularly to the control of electrical current causing corrosion in the sub-surface metallic structures of oil wells, which corrosion is other than, and sometimes in addition to, the corrosion caused by corrosive gases and local electrolytic action in the metal structure of the well.

When all surface lines and equipment, such as oil lines, gas lines, polish rods and water lines, connected to the well structures at the surface, are provided with insulating means to protect against stray electrical currents and inter-well coupling, potential profiles run within the innermost string of pipe or casing, which extends from the surface to total depth, reveal that electrical current is flowing on the sub-surface structure. It is to the control of this current flow that this invention is directed.

Such potential profiles show that in some wells current is entering the structure at or near the surface and flow downward, leaving the structure at depth and causing corrosion where it leaves the pipe and enters the strata; such wells are commonly called "negative wells."

Potential profiles also show that in some wells current is leaving the structure at or near the surface, causing corrosion where it leaves the pipe and enters the strata, the current having entered the structure at depth and flowing upwardly. Such wells are commonly designated "positive wells."

One of nature's phenomena, which has a direct bearing on the problem of corrosion, is that samples of any ferrous material cut from the same stock of exactly the same size and weighing the same, will show a potential difference existing between them when immersed in an electrolyte. Should they be connected either by a second electrolytic bath or by a solid conductor, or both, current will flow and the anodic sample will corrode. As the area of the anodic sample in contact with the electrolyte is increased, the current flow is increased, and continues to increase as the area is increased.

In any oil field there is always a difference in the amount of pipe in contact with conductive strata; variations in surface elevations, or dips in the formation in some instances could account for this difference. Different sizes and lengths of pipe are also used in different wells; also different grades of the same size pipe. In many fields wells are produced from different depths. Any one or all of these variable factors creates a potential difference between well structures. This potential difference is the primary cause of current flow between wells, leading to corrosion and many other production problems. The surface pipe and casing of producing wells, except at the shoe where they are set in cement, are encased in drilling mud which provides electrolytic conduction and connection with all the strata penetrated.

The current flow between wells can be likened to the flow of current in a dry-cell battery. The oil string of the anodic well, below the shoe of the surface pipe, represents the zinc casing or negative pole of the battery. The oil string of the cathodic well, below the shoe of the surface pipe, represents the carbon rod or positive pole of the battery. The oil string is no longer in contact with the strata after it enters the surface pipe and has no effect on the strata above this point. The strata penetrated by both wells above the shoe of the surface pipe and/or the flow lines represent the load resistance that shorts the dry-cell battery. This comprises an electromagnetic or self-energizing cell. Current flowing on the sub-surface structure of an oil well is not limited to the surface pipe and oil string in contact with the strata, but is transferred to, or from, the production tubing at points where the tubing contacts the oil string and, in pumping wells, to or from the rods where the rods contact the tubing, contributing to corrosion and other production problems encountered in these portions of producing wells.

I have also discovered that, in some wells, the deposition of both organic and inorganic solids is due in part to the electrical charges normally existing on the structures.

An object of this invention is to determine the polarity of the well head, whether current is entering or leaving near the surface.

Another object of this invention is to determine the direction of current flow sub-surface, either to or from the well radially in respect to the well and the actual compass direction meaning and in reference to, north, south, east or west.

Another object of this invention is to substantially prevent the entry into a negative well structure of current normally tending to enter below the surface from a positive well structure, by the use of a counter-electromotive force and a method of determining the value of the counter-electromotive force necessary to achieve the desired results, without disturbing the normal operation of the well.

Another object of the invention is to reduce to a minimum the amount of counter-electromotive force current required, by locating the introduction of said force at a depth sufficient to be below one or more conductive stratum.

Another object of this invention is to control the precipitation of both organic and inorganic precipitants within, or adjacent to, the well structure where the precipitation has been caused by the normal charge existing on the structure.

Still another object of this invention is to bring that portion of the sub-surface structure lying below the surface pipe of a negative well to substantially a neutral potential, in respect to adjacent wells, all the objectives being achieved without the necessity of pulling the well or disturbing the normal operation thereof.

Other objects and advantages of the invention will be, in part, evident to those skilled in the art to which the invention appertains, and in part pointed out hereinafter, in the following description taken in connection with the accompanying drawings: wherein—

When the objectives of this invention are first considered, there are some who might confuse them with "cathodic protection." However, they are actually the opposite.

The objective of this invention is to prevent the current which had normally been entering from the anode of an impressed current cell, from entering a negative well; cathodic protection of a pipe line provides a means for long line or stray currents already existing in the line, to leave it harmlessly.

If we were to apply the teachings of this invention to a pipe line, the application would be made in the area where long line or stray current is entering the line, not where it is leaving, as is the practice in applying cathodic protection.

Figures 1, 3:
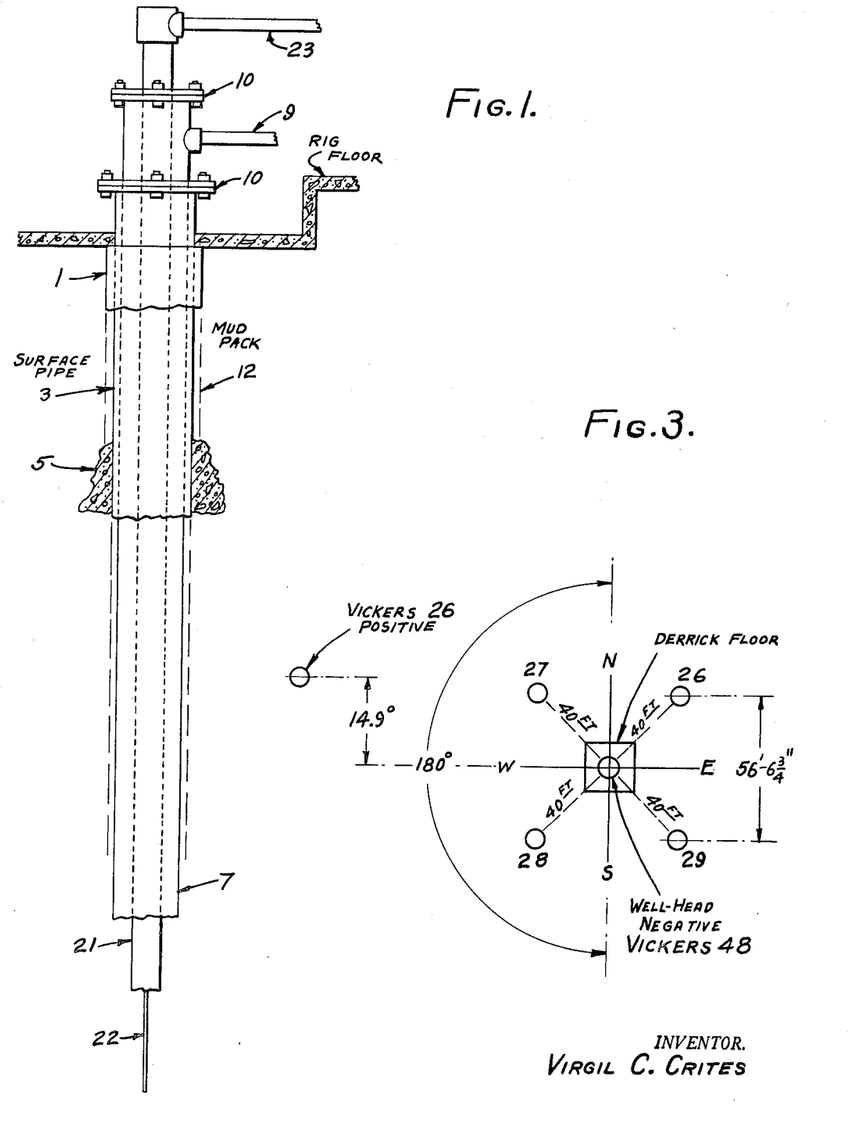
FIG. 1 is a sectional view of the sub-surface metallic structure of an average oil well and the surface connection.
FIG. 3 is a plan view showing the arrangement of test holes and reference lines for making sub-surface survey.

Referring now to FIG. 1. The sub-surface metallic structure of the average oil well is composed of the conductor pipe 1 which may extend only a few feet below the surface and which is used to prevent surface caving of the hole, this pipe possessing the largest diameter. Drilling is then resumed through this pipe until the surface pipe 3 is set. This pipe is the next largest in diameter and may extend from a hundred feet to one thousand or more, and is conventionally used to protect areas of fresh water from contamination, and to serve as a protective string for the oil production pipe. The drilling is customarily accomplished by the use of drilling mud which is circulated for the purpose of removing the cuttings of formations penetrated by the cutting bits. When the surface pipe is set, it is completely encased in drilling mud 12 which provides electrolytic conduction and connection to the various strata penetrated. However, the shoe of the surface pipe, where it rests on the formation, has no encasement of drilling mud but is encased in cement 5, from the bottom upward for a number of feet. The pipe is cemented in the hole for the purpose of securing a water shut-off and securing the pipe in the hole. Drilling is continued through the surface pipe to total depth. The pipe which extends to total depth is generally referred to as the "oil string" 7; it is like the surface pipe being encased in a mud pack 12 composed of drilling mud, except at the shoe where it terminates and, as with the surface pipe, it also is encased in cement at this point. It was recently reported that evidence has been established, experimentally, that encasing a pipe in a cement jacket is capable of altering the normal potential of the pipe. For the purpose of conveying the production to the surface, it is the custom to provide a string of tubing 21, which is known as the production tubing. The entire tubular structure being connected at the surface by one or more flanges 10.

In the case of a pumping well a string of sucker rods 22 placed within the production tubing is provided, and these rods are connected to a pump at the bottom of the hole and to a pumping unit located on the surface for the purpose of actuating the pump and lifting the oil to the surface where it enters a pipe customarily referred to as "the oil line" 23, which conveys the produced oil to the receiving tanks. Another line 9 is customarily attached to the oil string or casing, commonly referred to as "the gas line," which conveys the produced gas to a point where it is attached to gathering lines which may run throughout the field. It is common practice in drilling an oil well to run an electric log in the naked or uncased hole, and these logs reveal and record the resistivity of the strata penetrated. The resistivity may vary from one ohm ($M^2M$) to in excess of 100 ohm meters ($M^2M$), and abrupt changes in resistivity may be noted in only a few feet.

From the areas of permanent moisture to total depth, these resistivities remain constant and do not change. As an illustration of this fact, Western Gulf KCL B22, in the Fruitvale Field, Kern County, California, was first logged in 1943. In 1956 the well was re-logged. In the thirteen years between these two log runs, the formation had not changed in resistivity.

Figure 2:
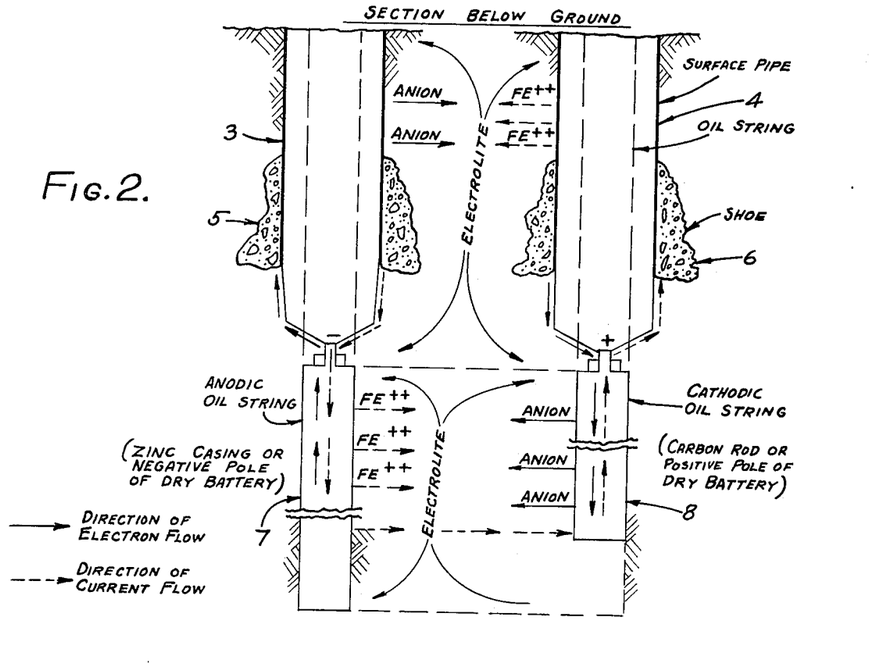
FIG. 2 is a diagrammatical sketch illustrating the theoretical flow of current between two well structures.

Referring now to FIG. 2, conductor pipe and mud pack not shown, and assuming that the two well structures have been protected against the introduction of long line, or stray currents or metallic inter-well connection, by the use of insulation flanges or insulating materials installed in all surface lines and equipment, such curren as may be flowing on the structures and revealed by potential profiles run in the oil string, is the result of electrolytic action between the well structures. There are available potential profiles showing over 2 amperes flowing on a structure with the flow line not insulated, and approximately 4/10 amperes flowing with the flow lines disconnected.

There are two separate and distinct types of electrolytic cells. Both types are to be found existing in the normal transfer of current between two well structures, the action of each causing corrosion. One type of electrolytic cell is termed an electrogenetic cell which generates electricity such as an ordinary dry-cell or flashlight battery. The other type is called an impressed current cell, such as is found in electroplating systems where current from an outside source is fed into the system. In FIG. 2 the direction of current flow is designated by broken line arrows, and the direction of electron flow by solid arrows.

In the area below the shoe 5 and 6 of the surface pipes 3 and 4, the oil strings 7 and 8 and electrolytic conduction of the strata constitutes an electrogenetic or self-energizing cell, and the resultant flow of current decomposes the anodic oil string 7 which is electro-negative, the oil string 8 becoming the cathode which is electro-positive.

The oil strings 7 and 8 are no longer in contact with the strata after they enter the surface pipes 3 and 4 and, in consequence, the electrogenetic cell is terminated at, or adjacent to, this point. The surface pipes 3 and 4 are encased in cement at the shoe 5 and 6 where the oil strings 7 and 8 enter the surface pipes, and the fact that encasing the pipes 3 and 4 in cement is capable of altering the potential of the pipe, assists in the termination of the electrogenetic cell.

The current flowing from the anodic oil string 7 to the cathodic oil string 8 is fed by the cathodic oil string into the surface pipe 4 encasing the cathodic oil string 8. The current thus impressed on the surface pipe 4 encasing the cathodic oil string 8, leaves the surface pipe 4 through the electrolytic conduction of the strata adjacent to the surface and above the shoe of the surface pipe, constituting the anode of an impressed current cell. This anode is electro positive, just the opposite of the anode of the electrogenetic cell. Wherever the current leaves the surface pipe 4, corrosion results. Current leaving the surface pipe 4 flows through the conducting strata to the surface pipe 3 which becomes the cathode of the impressed current cell and is electro-negative, said current flowing on said surface pipe to some point, or points, where it leaves the surface pipe 3 and enters the anodic oil string 7, thus completing the electrical circuit. The strata penetrated by the surface pipes constituting the load resistance supporting the flow of current in the electrogenetic cell in much the same manner as the light bulb in a flash-light constitutes the load resistance for the flashlight battery.

We, therefore, have a closed electrical circuit composed of four legs. One leg is the sub-surface metallic structure 3 and 7; the second leg is composed of the strata below the surface pipes, which serves as the electrolyte for supporting current flow in the electrogenetic cell to the well structure 8 and 4, which is the third leg. The fourth leg is the strata adjacent to the surface above the shoe of the surface pipes 3 and 4, which constitutes the load resistance supporting the current flow in the electrogenetic cell, and the electrolyte for supporting current flow in the impressed current cell.

Referring now to FIG. 3, to establish the actual direction of current flowing in the sub-surface zones adjacent to the well structure. The area about the structure is divided into four quadrants and four holes 26, 27, 28 and 29 are drilled at 90° from each other and equidistant from the well structure. The distance from the well structure is largely determined by the surface condition and surface structures. I have found good results are obtained when the holes are drilled 40 feet from the structure, care being taken to see that the holes are drilled equidistant from the well structure and equidistant from each other. Referring points in relation to the drilled holes generally being established by compass direction—north, south, east and west.

The holes 26, 27, 28 and 29 are drilled dry and the depth to which they are drilled depending upon local conditions encountered at the well site, but always to a zone of permanent moisture. In practice, the holes have been drilled to depths varying from 12 to 33 feet. It is preferable that the depth of the holes be below one or more conductive stratum for reasons which will be explained later. When the holes have been drilled to the desired depth, identical carbon electrodes, approximately 18 inches long and 3 inches in diameter whose potential in respect to each other in an electrolytic bath have been substantially matched are lowered into the drilled holes. These electrodes are then covered with salt water to insure good electrical contact with the soil and potential measurements, using a high resistance voltmeter, are made between each electrode and the well head and, if desired, between each electrode and every other electrode. The electrodes are then withdrawn and the holes back-filled. Other types of electrodes, such as coppr sulphate half cells, may be used.

The polarity of the well head is established by taking a potential drop across the insulation flange, or flanges, or by the potential drop across a given span of either the oil production line or the gas line, or both. In practice, two of the four electrodes—26, 27, 28 and 29—will be found to be at a higher potential in respect to the well head than the other two. These same two electrodes will also be at a higher potential than the other two electrodes.

Should the sub-surface potential survey be made at a negative well site, that is a well where current is entering the structure at or near the surface, the position of the two electrodes at the higher potential will denote the general direction from which current is entering the well structure. Should the sub-surface potential survey be made at a positive well site, one where current is leaving the structure at or near the surface, the position of the two electrodes at the lower potential will denote the general direction of current flow from the well structure.

One method of calculating the approximate center line of the field of force, which I have found satisfactory and explained in reference to (FIG. 3), an actual survey made at the well site of a producing well in the Baldwin Hills section of the Inglewood Field, Los Angeles County, California, and known as Vickers 48.

Reference lines were first established by compass readings, as indicated. Four holes—26, 27, 28 and 29—were located 40 feet from the well head, and 56 feet 6¾ inches from each other. All holes were drilled dry to a depth of 15 feet. Into these holes carbon electrodes, previously described, were lowered to bottom and covered with salt water to insure good electrical contact with the stratum.

The potentials between the various electrodes and the well head were measured by means of a high resistance voltmeter, 50,000 ohms per volt. The values recorded being: electrode 26 to well head .26 volt; electrode 27 to well head .425 volt; electrode 28 to well head .36 volt; electrode 29 to well head .22 volt. After the taking of these measurements the electrodes were withdrawn and the holes back-filled. This well had previously been determined to be a negative well, one where current was entering the structure and therefore, as previously explained, the current was entering the well structure from a general westerly direction; electrodes 27 and 28 being at a higher potential than electrodes 26 and 29. In all measurements the electrodes were electropositive to the well head.

The potential values represented by the 180° segment, which includes the north, south and west center lines, totalling .785 v. representing the total value of force in the 180° segment.

Dividing .785 v. by 180° equals .00436 v. per degree. The difference in potential between electrodes 27 and 28—.425—.36 equals .065 v.

Electrode 27 being at the higher potential—dividing .065 by .00436 equals 14.9°.

Therefore, if the entire 180° segment, but not including the test holes, was rotated about the well head in a clockwise direction 14.9 degrees, the west center line in the 180 degree segment would point to the approximate center line of the field of force.

At the well head a protractor was used and at approximately 15 degrees from the west center line another well, Vickers #26, was found. Vickers #26 being located 300 feet in the horizontal plane from Vickers #48 and in the vertical plane due to surface contours, it is approximately 150 feet below Vickers #48. A potential drop through a high resistance voltmeter between two well structures confirms the polarity of each in respect to the other.

While the determination of the exact center line of the field of force is desirable, it is not necessarily a prerequisite to a successful installation, as the current distribution and spread of the anodes, which furnish the counter electromotive force, require that only the general direction of current flow in the sub-surface zones be established, the normal well spacing in the average oil field being such as to virtually eliminate any possibility of error in the identity of the positive well structure.

Although there may be a number of different methods of calculating the approximate center line of the field of force, the measurement of potentials around the well structure is a prerequisite to the use of any method. The approximate center line may also be determined by simulating conditions found at the well site in a non-conductive receptacle filled with an electrolyte.

Having established by means of the sub-surface survey the physical relationship of the two wells involved in the electrical circuit, described in reference to FIG. 2, the next step is the introduction into one leg of the circuit counter-electromotive forces in such manner as to oppose the flow of current normally existing in the entire circuit, and thus prevent entry into the negative well structure of current which had been entering it from the positive well structure, before the application of said counter-electromotive force.

The sub-surface metallic structures constitute parallel conductors, in respect to each other, and all the strata penetrated by the structures are parallel conductors in respect to the two well structures.

The resistivity of the strata penetrated may vary from one ohm meter to 100 ohm meters or more but, because of abrupt changes in resistivity may be found in a very few feet, in respect to their total depth, approximately 275 changes in resistivity being noted on one electric log from 80 feet to 2740 feet, the parallel resistance between well structures is very low, even when they are located at a considerable distance, but when they are fairly close together as they are generally found, particularly when two or more productive sands are being produced, the parallel resistance between structures is reduced to a fraction of one ohm.

The potential developed by the electro-chemical action in the electrogenetic cell responsible for the flow of current in the circuit is very low, and therefore counter-electromotive forces of relatively low potential, if properly placed, are sufficient to oppose it.

To oppose this flow of current, the counter-electromotive force must be applied in such a manner that negative must oppose negative, and positive must oppose positive.

Figure 4:
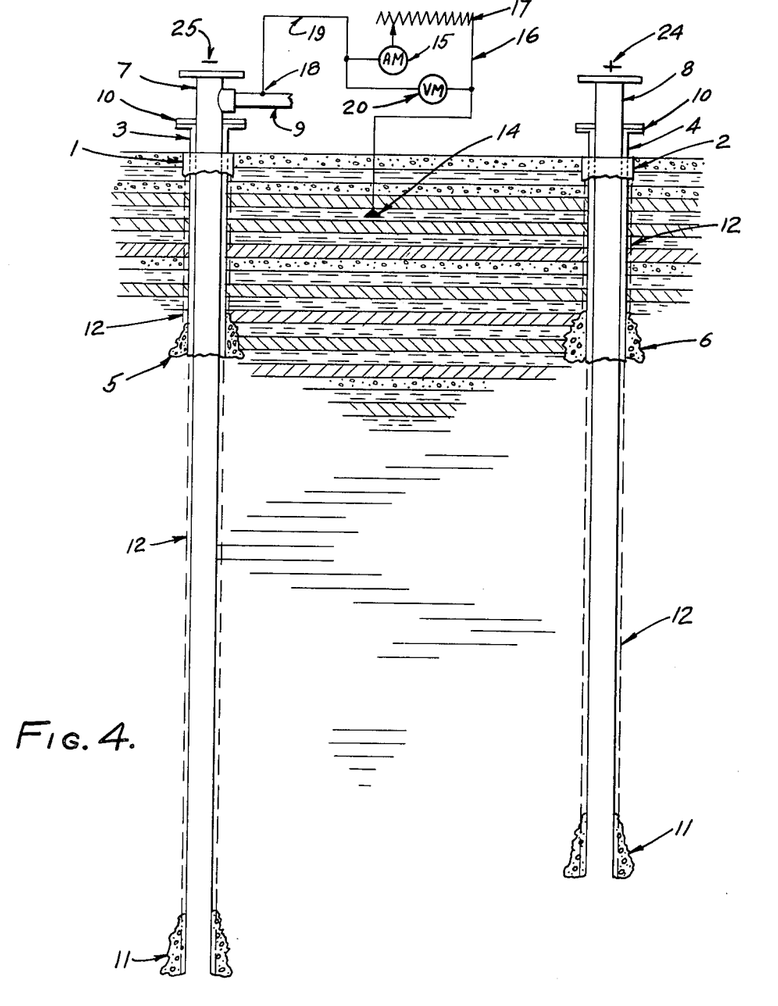
FIG. 4 is a sectional view of two well structures, anode location and electric circuitry associated therewith and strata penetrated by the well bores.

Referring now to FIG. 4, which represents two well structures between which current is flowing and the various metallic tubes one within the other which are in contact with the conductive strata, the conductor pipes 1 and 2 for their full length. The surface pipes 3 and 4—except where they are shielded from the strata by the conductor pipes 1 and 2 and the cement jackets 5 and 6. The oil strings 7 and 8 except where they are shielded by the surface pipes 3 and 4 and the cement jacket 11. The mud packs 12 insuring good electrical contact with the strata.

The oil strings 7 and 8 are the most important elements of the sub-surface structures as failures of these pipes, due to holes caused by corrosive attack, will permit either or both, fresh or salt water to enter the oil producing portion of the well, and it is from these pipes that current is transferred to the production tubing where the tubing contacts the oil strings.

The mere fact that current is flowing on the oil strings 4 and 4-A often results in failure of these pipes at, or adjacent to, the couplings which are generally found about every 30 feet throughout their length.

When a damaged oil string was recovered from a well in Ventura Country, California, the corrosion was practically limited to 180 degrees of the circumference of the pipe, showing the current was leaving the pipe in a fixed direction. Severe corrosive attack was found on the oil string adjacent to the collars, and the collars from 2500 feet to 4500 feet. There is a migration of water back of the pipe and, as a result, the mud pack 12 encasing the oil string is moist and an excellent conductor of current. The threaded collars join the sections of casing, and if there is the slightest electrical resistance at the threaded connections, some of the current will leave the pipe adjacent to the collar, causing corrosion when it leaves, and flow to the collar through the mud pack, leaving the collar at the other end, causing corrosion of the collar where it leaves and flows through the mud pack to the casing. The direction the current had been flowing, either upward or downward, being at once evident upon examination of the pipe and collar.

While the amount of current so transferred may be a negligible portion of the total, with the passing of time amounting to years, the destruction so caused can, and does, result in pipe failure. It is, therefore, desirable to limit the amount of current flowing on the oil strings 7 and 8 to a minimum. This is accomplished in the practice of this invention.

Figure 5:
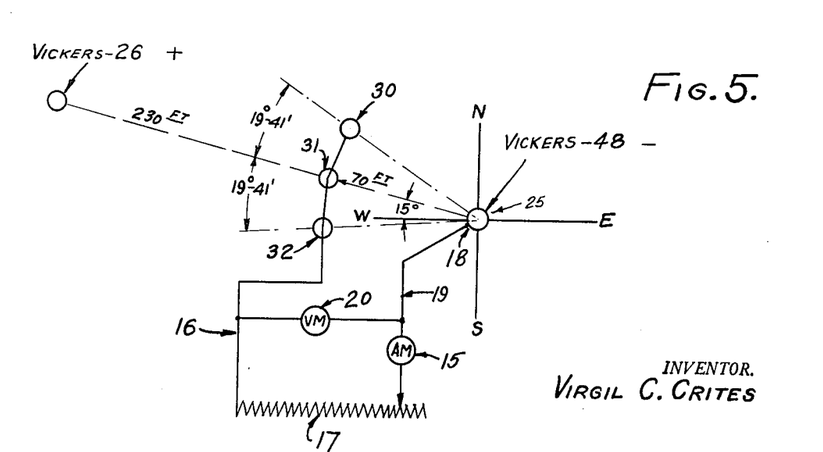
FIG. 5 is a plan view of anode locations in respect to two well structures and electric circuitry associated with said anodes.

Referring now to FIG. 5, which is a plan view of the actual installation made at Vickers #48, after the sub-surface survey described in reference to FIG. 3.

Three holes, as shown, were drilled at 70 feet from the well head to a depth of 15 feet, 15 degrees north of the west center line, and into each a seventeen-pound magnesium anode was lowered, covered with salt water to activate the magnesium, and the holes back-filled. The three electrodes—30, 31 and 32—were then connected in parallel and to one side of a variable resistance 17 by the conductor 16, the moveable side of the variable resistance being connected to one side of a milliammeter 15, the other side of which is connected to the negative well head 25 at the point 18 through the conductor 19.

A high resistance voltmeter, 50,000 ohms per volt being connected to shunt with the variable resistance 17 and the milliammeter 15. The placement of the anodes—30, 31 and 32—covering an arc of 39° .22'; this coverage in area compensating for any errors that might occur in the determination of the center line of the field of force existing between the two well structures 24 and 25, as described in relation to FIG. 3.

The open circuit potential difference between magnesium anodes and the well head, as measured by a high resistance voltmeter, 50,000 ohms per volt, being approximately one volt more or less. When energy is released from the magnesium anodes the electro-chemical action is similar to that of the electrogenetic cell formed by the oil strings 7 and 8.

When the current flowing on a well structure is measured, the measurements, known as potential profiles, are made within the oil strings 7 or 8—FIG. 4. This pipe extends from total depth to the surface, contacting the strata from total depth to the shoe of the surface pipe, and any measurements made within this portion of the pipe will show either gain or loss of current in respect to the strata at the point of measurement. From the shoe of the surface pipe to the surface, the oil string 7 is encased within, and electrically shielded from, the strata by the surface pipe 3, and any electrical measurements made within the oil string in this portion of its length do not accurately reflect either gain or loss of current in respect to the strata penetrated by this section of the oil string 7.

For this reason, very little is known as to the behavior of energy released in the strata above the shoe of the surface pipe 3.

The only evidence of record relates to the drilling of a test well in the Cymric Field, Kern County, California. The primary reason for drilling the test was to determine the feasability of using the sub-surface strata for the disposal of salt water, without damaging or polluting fresh water zones. To make this determination, it was necessary to drill the test without using water or mud in the drilling operation. No water or mud was used in drilling to a depth of 270 feet, the hole being drilled dry.

Figures 7, 8:
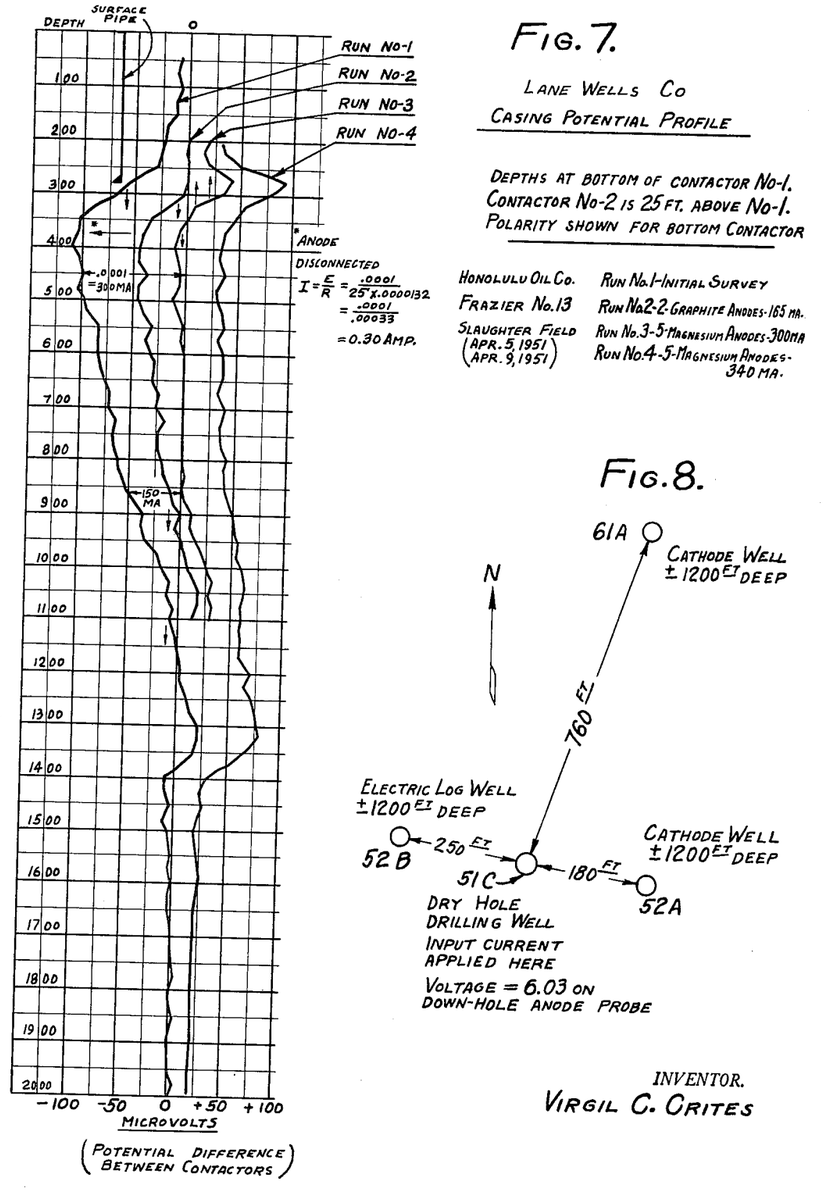
FIG. 7 is a reproduction of four potential profiles illustrating the effect of applying counter-electromotive forces.
FIG. 8 shows the relative location of three oil wells, in respect to the dry drilled test well in the Cymric Field, Kern County, California.

FIG. 8 shows the relative location of the test well in relation to existing oil wells.

The drilling of this test presented an opportunity to determine and observe just what does happen when current is released in a given stratum, and whether or not it flows on a diagonal path from the anode through the various strata, or whether it flows parallel to the stratum in which it is released.

When the well 52–B was drilled, an electric log was run in the naked or uncased hole, and it was certain the same resistivities would be found in the test well 51–C and the offset wells 52–A and 61–A. Surface contours or dips in the formation would account for any slight deviation in depth.

At each 5-foot interval in depth a core sample was taken, which was immediately frozen in Dry Ice and rushed to the core laboratories in Bakersfield, where sand and moisture content were determined.

At these same intervals an insulated conductor, with a steel probe on the end, was run to bottom, the steel probe being heavy enough to make good electrical contact.

A potential of 6.03 volts was applied to this probe and current passed to the two offset wells—52–A and 61–A. The same external resistance was used, and each well in turn (52–A and 61–A) used as the cathode for the return circuit.

In the area in which these tests were run the electric log established resistivities which varied from approximately 5 $M^2M$ to approximately 100 $M^2M$.

Figure 9:
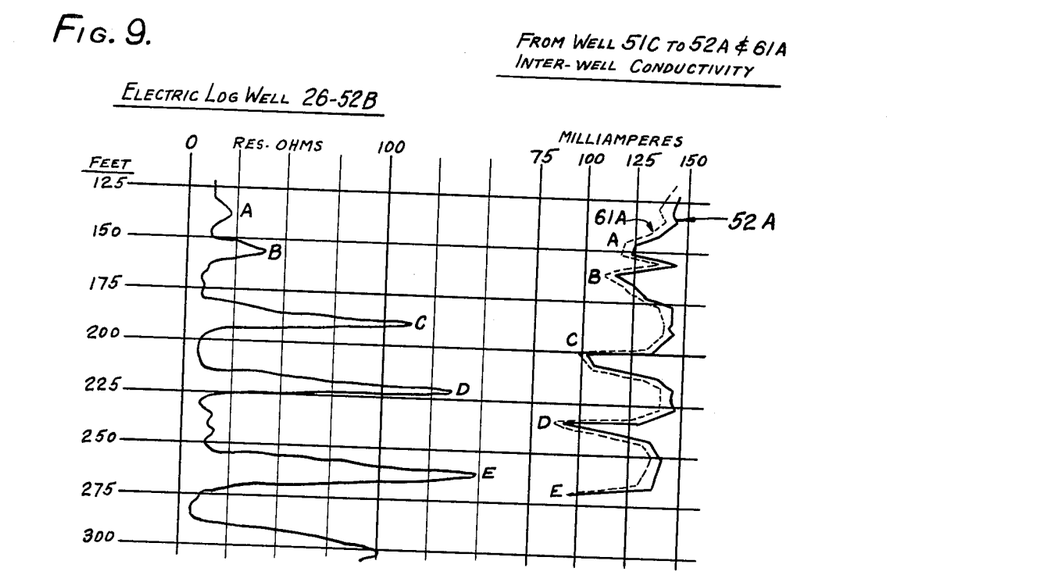
FIG. 9 shows curves compiled from dry drilled test well in the area, from 125 feet to 270 feet, showing inter-well conductivity in respect to resistivity of strata.

A curve was compiled from the results obtained, which correlated with the electric log of well 52–B. FIG. 9 shows a portion of this curve from 125 feet to 270 feet.

The amount of current received by the casing (cathodes) of the two adjacent wells (52–A and 61–A) was roughly proportional to the conductivity of each stratum contacted by the probe.

From the results of this test it can be shown that current entering a highly conductive stratum of low resistivity, travelled through this stratum to the cathodic casing, and that current entering a stratum of high resistivity travelled obliquely, either upward or downward to a strata of high conductivity and low resistivity, and thence to the cathodic casing.

The conclusion is that current released in the sub-surface strata flows parallel to the stratum in which it is released, and if this current flow is to reach depths below areas of high resistivities some means must be provided to shunt this current around these areas of high resistances.

Figure 6:
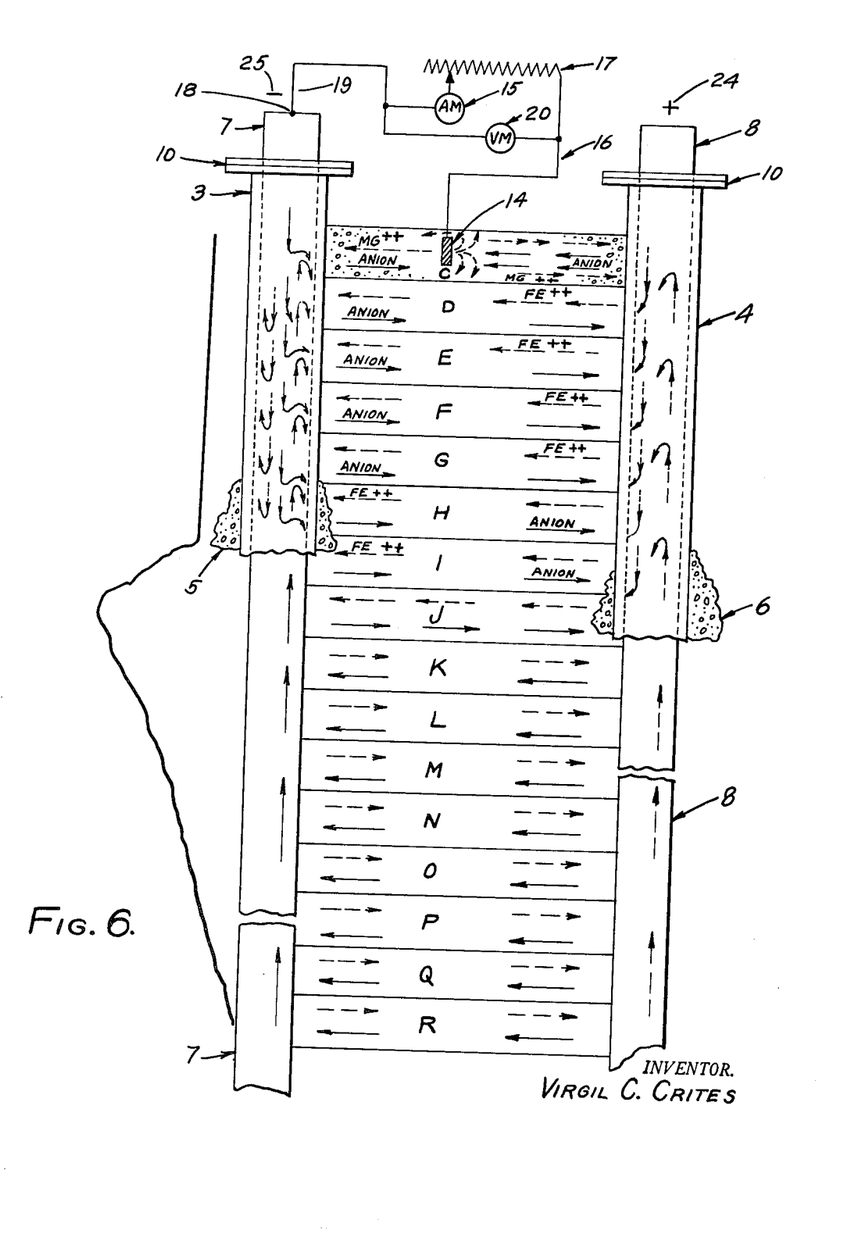
FIG. 6 is a detailed sectional view illustrating the effect of applying counter-electromotive forces.

This action can be more fully explained in reference to FIG. 6 which is a detailed sectional view of the sub-surface structures of two wells (24 and 25) and the strata penetrated by the well structures. (The conductor pipe and mud pack are not shown.) The flow of electrons and negatively charged particles being represented by solid arrows, and the flow of conventional current and positively charged particles being represented by broken line arrows.

The strata C—D—E—F—G—H—I—J being parallel resistances conducting current flow in the impressed current cell, as described in reference to FIG. 2. The resistivity of the strata shown may vary from 1 ohm $M^2M$ to 100 ohm $M^2M$.

For the purpose of this explanation we will assume that the magnesium anodes 14 are buried immediately adjacent to the surface, at a depth of only 5 feet.

The magnesium anodes 14 are connected by conductor 16 to one side of a variable resistor 17 whose value can be continuously changed through very small increments, so that the release of energy from the anodes 14 can be closely controlled.

An ammeter 15 is connected to the movable member of the variable resistance 17 and, by means of the conductor 19, to the negative well head 25 at the point 18 on the oil string 7. A high resistance voltmeter 20 being in shunt between the anode 14 and the well head, measuring the potential drop across the variable resistance 17.

As energy is released from the anodes 14 the action is the same as the electro-chemical action in the electrogenetic cell portion of the circuit, as described in reference to FIG. 2. The anodes losing electrons which flow through the above-described circuit to the well structure 25, leaving the structure as negatively-charged particles, anions, the anodes thus becoming electro-negative to the structure 25. Conventional current in the form of positively charged particles, leaving the anodes and flowing through the strata C to the well structure 25, and thence through the conductor 19, ammeter 15, resistance 17, conductor 16 to the anodes 14.

The force released from the anodes, as positively charged particles, opposes the flow of current in the form of positively charged particles, from the structure 24 in the stratum C, and the electrons flowing from the anodes to the structure 25 oppose the flow of electrons from the electrogenetic cell portion of the circuit, as described in reference to FIG. 2.

When these opposing forces are equal to those previously existing in the stratum C, the only flow of current in stratum C is from the anodes to the structure 25. As more energy is released from the anodes, current flows not only from the anodes to the structure 25, but also to the structure 24, opposing the normal flow of current upward on the structure 24, leaving the structure 24 through the stratum D, and thence to the well structure 25 and back to the anodes through the previously-described circuit.

At the same time the increase of electrons released from the anodes repel electrons flowing up the structure 25, and move through the stratum D in the form of anions to the structure 24, and thence to the anodes in the stratum C.

It will be observed that there has been no change in the direction of flow in the stratum D, of either anions or the cations which are the positively charged particles. The only change in direction of flow being in that portion of the stratum C lying between the anodes and the structure 24.

As more energy is released from the anodes 14 more current flows to the structure 24, repelling more of the current flowing upward on the structure 24, more electrons being released from the anodes repel more of the electrons flowing upward on the structure 25, and both the negatively-charged particles and the positive-charged particles flowing also through the stratum E, as well as the stratum D as they become parallel conductors, the current dividing according to the resistivities of the strata in accordance with Ohm's law.

As more and more energy is released from the anodes 14, the same reaction takes place in relation to the strata F, G, H, I, and J, each in turn becoming involved as parallel conductors supporting the flow of anions and cations originating in the anodes 14, and the direction of flow in said strata being the same as had been the flow of anions and cations originating in the electrogenetic cell portions of the circuit described in reference to FIG. 2.

When the energy release from the anodes 14 reaches the value to exactly equal the value of the energy released by the action of the electrogenetic cell portion of the circuit described in reference to FIG. 2, the two well structures are in electrical balance in relation to the electrogenetic cell portion of said circuit, and no current would flow in that portion of the circuit.

The cathodic portion of the impressed current cell, the surface pipe 3 structure 25 would still be cathodic but the anodic portion of the electrogenetic cell, the oil string 7 would be eliminated and at a neutral potential with respect to the oil string 8 of the structure 24.

As more energy is released from the anode 14, the oil string 8 of the structure 24 becomes anodic in respect to the oil string of the structure 25 for the full length of the oil string 8, and all the strata lying below the stratum J become parallel conductors to the flow of current which results.

The direction of current and electron flow in these strata being in a direction opposite to the flow existing before the application of counter-electromotive forces. The length of the oil strings 7 and 8 being a number of times greater than the length of the surface pipes 3 and 4, the parallel resistance of the strata penetrated by said oil strings is much lower in resistance than the parallel resistance of the strata penetrated by the surface pipes 3 and 4.

Because of this fact, a large portion of the current which had been flowing between the surface pipes no longer flows between them as, seeking a new path of lower resistance, now flows between the oil strings.

This phenomenon is graphically shown in FIG. 7, which figure shows four different potential profiles run in a producing well located in the Slaughter Field, West Texas. This well was a negative well, one where current was entering at, or near, the surface. The surface lines for conducting oil and gas being equipped with insulating flanges.

Referring to FIG. 7 and the equation shown, we find Run #1 recording the normal flow of current on the structure and, prior to the application of counted electromotive forces, this normal flow being approximately 330 milliamperes entering the structure from the subsurface strata, and from the surface to 400 feet where the current entering the well reaches its maximum, approximately 330 milliamperes. From 400 feet to 1250 feet this current gradually left the structure.

Run #2 shows the application of 165 milliamperes of counter electromotive force, released from anodes buried 5 feet below the surface, and it can be observed at 280 feet, the shoe of the surface pipe, that exactly 165 milliamperes of current flow on the oil string has been suppressed. This entire flow of 165 milliamperes of counter electromotive force current entering the structure above the shoe of the surface pipe.

Run #3 shows the application of 300 milliamperes of counter electromotive force, applied by anodes buried five feet below the surface and it can be noted, at 400 feet, that exactly 300 milliamperes of the original current flowing on the oil string has been suppressed. However, not all of the 300 milliamperes of counter electromotive force current entered the structure above the shoe of the surface pipe, as the potential profile shows a part of this impressed current started to enter the oil string at 350 feet, flowing upward, as shown by the arrows, reaching a maximum of 125 milliamperes at 280 feet, the shoe of the surface pipe, where part of this upward flow of 125 milliamperes transferred to the surface pipe.

Since 300 milliamperes of counter electromotive force current was being applied, and 125 milliamperes entered the oil string below the shoe of the surface pipe, 175 milliamperes entered the surface pipe.

Run #4 shows the application of 340 milliamperes of counter electromotive force current, which is approximately 10 milliamperes in excess of the normal current flow recorded in Run #1.

The impressing of only 10 milliamperes in excess of the normal current flow resulted in current entering the oil string at 2,000 feet, the depth limit of the survey, flowing upward the full length of the oil string below the shoe of the surface pipe, gradually increasing to a maximum of 285 milliamperes at 280 feet, the shoe of the surface pipe, where the major portion of the 285 milliamperes transferred from the oil string to the surface pipe.

Since 285 milliamperes entered the oil string below the shoe of the surface pipe, out of a total of 340 milliamperes of applied current, only 55 milliamperes entered the surface pipe. 175 milliamperes entered the surface pipe when 300 milliamperes of counter electromotive force current was applied, but only 55 milliamperes when 340 milliamperes was applied.

Deducting the 55 milliamperes from the 175 milliamperes shows a net loss of 120 milliamperes from the surface pipe to the oil string, with an increase of only 40 milliamperes of applied counter electromotive force current.

Current will always choose the path of least resistance, to return to its source of origin and, since the surface pipe showed a loss of 120 milliamperes, a path of lower resistance to 2,000 feet must have presented itself when the release of counter electromotive force current exceeded the current normally flowing on the structure. A path of lower resistance would of necessity involve some medium of transferring the current to depth, by-passing the areas of high resistance in order to permit the current to flow through the parallel resistance below the surface pipe, and that medium could only be the sub-surface metallic structure of an adjacent well.

There was no change in the series resistance of the strata between the anode location and the depth of 2,000 feet, and the only way the resistance could possibly be lowered would be through the use, by the current, of a parallel conductor to depth, making all of the strata penetrated parallel conductors in relation to the two well structures.

At the point where the energy release of counter electro-motive force equals the value of the energy which had been entering the well structure from an adjacent well structure, the two oil strings are at a neutral potential in respect to each other, and current flowing to the surface pipe reaches its maximum.

Any further release of counter electromotive force upsets this balance, and the adjacent well structure now becomes the medium of transferring energy to the full depth of its oil string and making all the strata penetrated by the well structures parallel conductors. It is at this point where the surface pipe suffers the loss of 120 milliamperes to the parallel resistances between the oil strings.

In relation to the total depth of the current survey—2,000 feet; the length of the surface pipe, 280 feet, is 14 percent of said survey.

In relation to the total current flow of 340 milliamperes, the 55 milliamperes flowing to the surface pipe is 16.4 percent of the total current flow.

At the point of transition, where the surface pipe loses 120 milliamperes, this represents a loss of 68.5 percent.

Referring now to FIG. 6, and more particularly to the electrical circuit showing the ammeter 15, the voltmeter 20 and the variable resistance 17 which variable resistance is one whose value can be continuously changed through very small increments, so that the release of energy from the anodes can likewise be closely controlled. The ammeter 15 records the counter electromotive force current, and the voltmeter 20 records the potential drop across the variable resistance 17.

If one carefully observes the ammeter 15 while the variable resistance 17 is being varied with some degree of speed, the point of transition, that is where the surface pipe loses part of the current which had been flowing to it, and seeks a new path of lower resistance, there is a momentary dwell in the moving system of the meter and since the resistance is being continuously varied by the time the meter, due to the dwell and its inertia, is capable of responding to the current seeking the new path of lower resistance, there is flowing in the circuit sufficient additional current to impart a sudden surge to the meter reading, at the same point a sudden surge downward is imparted to the moving system of the voltmeter. By carefully observing each in turn, while the variable resistance is being varied with some degree of speed, the point of meter surge can be accurately determined.

The point of meter surge, due to the dwell and inertia of the moving systems, is always slightly behind the actual current flowing at the time of transition.

By maintaining the counter electromotive force current flow at the point of meter surge, the current flowing on the oil strings of both wells is reduced to a minimum, and said oil strings are maintained at substantially a neutral potential in respect to each other.

If the variable resistance is varied slowly, the point of transition is barely discernable, but if the resistance is varied with some degree of speed, it can be readily observed.

A measuring instrument without inertia, such as an oscillograph, would however make the point of transition easily observable, even when the resistance is varied slowly. Should such an instrument be used, the counter electromotive force current is maintained at a value equal to 90 percent of the value at the point of current or voltage surge.

At the well site a box containing a variable resistance and a milliammeter is provided. After the correct amount of counter electromotive force current has been determined, the current flowing through the meter is adjusted to the desired amount and thereafter maintained. Very seldom is any adjustment required but, if so, it is easily accomplished by use of the variable resistance in series with the meter.

The explanation of the flow of counter electromotive force current given in relation to FIG. 6, and the current flow illustrated by the potential profiles shown in FIG. 7, are all based on the anodes being buried at a depth of only 5 feet.

FIG. 4 shows the anodes 14 buried at a depth which places them below several conductive strata. When the anodes are so placed and the resistance 17 is varied, no current can flow to the well structure 25 and upward on said structure until the release of energy from the anodes exceeds the value of the energy entering the structure 25 from the conductive strata above the placement of the anodes. Thus, with the milliammeter 15 registering a current flow of only one milliampere, all the current entering the structure above the anode location has been repelled, and the registered flow of one milliampere is not an indication of the amonut of current so repelled. While the amount of enegy released from the anodes would be considerable, the current flow is reduced to a minimum. This is important because, as explained in reference to FIG. 6 and shown by the curves of FIG. 7, when the anodes are buried only 5 feet, the amount of counter electromotive force current required to repel the current tending to enter the negative well structure from the positive well structure, is equal to the current it repels.

The rate at which any metallic surface will corrode is dependent on the density of the current leaving the surface in the presence of an electrolyte.

Practially all of the counter electromotive force current, as explained in reference to FIG. 6, at some point leaves the metallic well structure 24, though not exceeding the amount normally leaving the structure, and any reduction in the amount of counter electromotive force current required to balance the well structure by placing the anodes at a depth below one or more conductive strata reduces the corrosion of the surface pipe 4 of the structure 24.

Referring to FIG. 6, and assuming that the conductor 19 is not bonded to the negative well structure 25, but is bonded to the positive well structure 24, if this were done some of the current flowing from the anode 14 would flow to the structure 24 through the stratum C, but it would also place the circuit of the anodes in series with the current flowing in the impressed current cell, and the electrogenetic cell and would in no way serve to repel the current normally flowing on the structure 24, but would offer to it a path through the anodes and associated circuitry, whereby it could leave the structure 24 harmlessly. It would not reduce the amount of current flowing on the oil strings which are the most important parts of the well structures. It could, however, add to the current normally flowing on both structures.

In making experimental installations of this invention, I have sought problem wells and have selected them because of the severity of their particular production problem. In all cases these wells were negative wells where current was entering the structure at, or near, the surface and every well to which this invention has been applied has benefited. (Their total depth varied from 1760 feet to 8300 feet.)

The preferred application of this invention, both as to making the sub-surface survey and establishing and maintaining the correct amount of counter electromotive force current is at a negative well, one where current is entering at or near the surface, and where all surface lines and equipment have been electrically insulated from the well structure.

Referring again to FIG. 3 and FIG. 5 and the previous explanation thereof, an actual experimental application of this invention: This well, Vickers #48, was completed May 21, 1950, as a pumping well, at a total depth of 1760 feet. The surface pipe of 13⅜ inches being 110 feet long. The oil string of 8⅝ casing and liner extending from the surface to total depth. There were 294 feet of perforations.

The initial production of this well was 433 bbls. per day, cutting 85 percent with a net oil production of 65 bbls. per day. The average for the first month of its productive life was 325 bbls. per day, cut 88 percent, with a net oil production of 39 bbls. per day.

This experimental installation was made November 5, 1954, at which time the production had declined to a gross of 295 bbls. per day, cut 95 percent, with a net oil production of 14.75 bbls. per day.

This well was highly corrosive, the iron count in the produced brines being 30 to 35 parts per million, which resulted in the dissolving in excess of 3 pounds of steel per day.

The sub-surface survey was made, as shown and described in reference to FIG. 3, and the anode location and method of placement, as shown and described in reference to FIG. 5, the electrical circuitry also being described in reference to FIG. 5.

When the variable resistance 17 was varied with some degree of speed, a distinct surge was observable in the reading of ammeter 15 when the current flow registered 117 milliamperes. By repeating the variation of the resistance 17 with some degree of speed and observing the voltmeter 20, a sudden surge downward in the reading was observable at .76 volt. At a voltmeter reading of .76 volt, the milliammeter reading was 117 milliamperes.

A box, commonly referred to as a pole box, was secured to the rig, this box containing a milliammeter and a variable resistance. The meter was removed and a red line drawn on the scale at 117 milliamperes. This meter was then replaced in the box. This box was provided with two terminals. To one terminal a conductor 19 leading to the well—FIG. 5—was secured. One side of the milliammeter 15 was secured to this same terminal; the other side of the meter to the variable arm of the variable resistance 17; the other side of the variable resistance being secured to the other terminal, this same terminal being connected to the anodes through conductor 16.

The high resistance voltmeter was then clipped across these terminals and the variable resistance adjusted so that the voltmeter registered a voltage drop of .76 volt. The zero adjustment of the milliammeter was then adjusted so that the needle of the meter rested on the red line drawn at 117 milliamperes. Within 30 days the iron count in the produced brines had decreased from 30 to 35 parts per million, to 7 to 10 parts per million, and continued to decrease.

On March 16, 1955, a new water line was run to Vickers #48 and, in the laying of this line, the wire from the magnesium anodes was cut.

I was notified of this fact by the lease superintendent on March 17. However, I did not have an opportunity to repair the break until late in the afternoon of March 22.

The following tabulation shows the results of the brine analyses, of both the negative and the positive well structures before the line was cut, during the period when the installation was inoperative, and after it was repaired. All brine samples were taken by pumpers in the employ of the owners and were analyzed for ferris content by their own chemists.

|  | Negative Well—Vickers #48—Iron count in brine | Positive Well—Vickers #26—Iron count |
|---|---|---|
| March 15, 1955 | 3.0 parts per million | 7.5 parts. |
| March 16, 1955 | Anode conductor cut |  |
| March 18, 1955 | 7.9 parts per million | 15.4 parts. |
| March 22, 1955, a.m. | 8.7 parts per million | 18.6 parts. |
| March 22, 1955, p.m. | Anode conductor repaired |  |
| March 25, 1955 | 3.9 parts per million | 9.1 parts. |
| April 2, 1955 | 1.0 parts per million | 11.6 parts. |
| April 5, 1955 | 1.5 parts per million | 10.0 parts. |

The positive well, Vickers #26, was being treated daily with a well-known chemical inhibitor, but it can be observed that the installation of this invention had a beneficial effect, regardless of the inhibitor being used. After the demonstration of this fact the use of the chemical inhibitor was discontinued and none has since been used.

In many wells there is an accumulation of waxes and scales, both within the well structure and on the external walls of the liner and face of the formation. Some of these accumulations may be due to the charge normally existing on the structure.

In this particular well, with the charge removed by bringing the oil string to substantially a neutral potential, these accumulations on the external walls of the liner began to loosen, due to the washing action of the produced fluids, and were carried on into the well structure where they were removed by bailing. This resulted in an increase in production from 14.75 barrels per day. The average production, as of this time over 5 years after the installation was made, being approximately 40 net bbls. of oil per day, the gross daily production being approximately 500 bbls. per day. It is producing today, nine years after completion, as much oil as it produced the first month.

This installation has been very successful in controlling the corrosion in both the positive and negative wells, for a period of over 5 years, and continues to do so. Very seldom is any adjustment required at the pole box, to keep the needle of the milliammeter registering a current flow of 117 milliamperes.

The ability of this invention to control the corrosive attack in both of these wells being evidenced by the control of the ferris material in the brines, which is the accepted method used by the industry in evaluating the effectiveness of any method of corrosion control.

In August 1955, an experimental application of this invention was made on a pumping well producing from a depth of 4,365 feet, located in Signal Hill Field, California, to determine the effect on several production problems. The well was a negative well, one where current was entering at, or near, the surface. All surface lines and equipment were electrically insulated.

This well was a small producer but was rapidly losing its productive ability. In the year prior to being electrically balanced, it had suffered a net loss of 13½ bbls. of oil per day, and was producing only 7 net bbls. of oil per day at the time the well was equipped. The water production being only 4 to 5 percent of the total production.

The well was also troubled with the accumulation of wax in the tubing, rods and pump. The operator had found it impossible to lower the pump to bottom, because within a week to ten days it would wax up so badly the well would require pulling.

With the pump located 150 feet off bottom, the well required pulling 4 times a year, and pump repairs were required at least once a year. Corrosion of balls and seats was responsible for requiring pump repairs, while waxing of tubing and rods, as well as the pump, required pulling the well to remove the wax.

Figure 10:
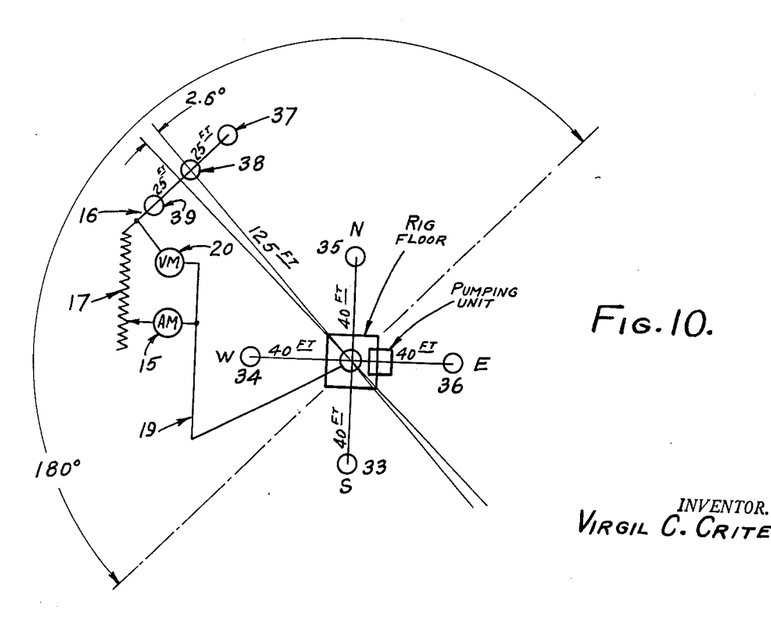
FIG. 10 is a plan view of test holes, anode location, an electric circuitry of an experimental installation at a producing well.

FIG. 10 shows schematically the holes drilled in order to make the sub-surface survey. The holes were drilled 40 feet from the well head, on the reference lines north, south, east and west. These holes were drilled to a depth of 20 feet. Electrodes described in reference to FIG. 3 were lowered to bottom in each of the drilled holes 33, 34, 35 and 36, covered with salt water and the potential drop measured between each electrode and the well head.

Electrode #33=.43 v.; electrode #34=.47 v.; electrode #35=.47 v. and electrode #36=.4425 v.

When the drilling machine was drilling the hole 34, the drill encountered a pipe several feet below the surface and the location of the hole was moved 3 feet closer to electrode hole 35. Although when the readings were taken both 34 and 35 registered the same potential drop in respect to the well head and normally, under such a condition, the approximate center line of the field of force would be at a point midway between the electrodes, the moving of the location of hole 34 required that some correction be made. The calculation was based on the potentials recorded in reference to electrodes 33 and 36, assuming that the well had been a positive well, one where current was leaving the well structure at, or near, the surface and, as explained in reference to FIG. 3, such current would be leaving in the direction indicated by the pair of electrodes showing the lower potential in respect to the well head. The sum of the voltage of electrodes 33 and 36 being: .43 v. plus .4425 v. equals .8725 v.

These electrodes representing the value of the field of force which would be leaving the structure in the 180° segment, if the well were a positive well—

.8725 divided by 180 equals .00484 equals v. per degree
.4425 minus .43 equals .0125 voltage difference between 36 and 33
.0125 divided by .00484 equals 2.6 voltage difference in degrees between 36 and 33.

Since the current would be leaving from a positive well structure, the 180° segment including a line drawn midway between the electrodes 36 and 33 would be rotated 2.6° in the direction of the electrode at the lowest potential. By projecting this line through the well head and the other 180° segment, the line so projected would indicate the approximate center line of the field of force for current entering the well from the 180° segment at the higher potential.

Along this projected line and at 125 feet from the well, the center 17 lb. magnesium anode 38 was placed in a hole 20 feet deep and, on either side of this location 25 feet another hole was drilled 20 feet deep, and into each hole another 17 lb. magnesium anode was placed. The three anodes—37, 38 and 39—were connected together and to one side of the variable resistance 17 by the conductor 16, the moveable arm of the variable resistance 17 being connected to one side of a milliammeter 15, the other side of the milliammeter 15 being connected to the well head by the conductor 19. A high resistance voltmeter 20 being connected in shunt between the anodes and the well head, to measure the potential drop across the variable resistance 17.

When the variable resistance was varied with some degree of speed, a surge in the reading of the milliammeter was observed at a reading of 100 milliamperes, by observing the voltmeter 20 while the resistance was being varied with some degree of speed, a surge downward was observed at a reading of .64 volt. At a voltage reading of .64 v. the milliammeter read 100 milliamperes. As explained in reference to the installation on Vickers #48, a pole box was mounted at the well, containing a milliammeter and a variable resistance; the meter was so adjusted that, at a voltage drop of .64 volt, the milliammeter reading was 100 milliamperes.

Whereas prior to being equipped according to this invention, the pump could not be placed on bottom because of waxing, after the installation the pump was placed on bottom without any evidence of waxing, and it remains on bottom today. There has been no evidence of corrosion since the well was equipped. The well has been pulled but once in the last four and one-half years, and that to replace a completely worn out pump. The production of oil is substantially the same today as when the well was equipped, there being no further apparent decline in the production.

This installation indicating that the precipitation of waxes within the well structure was related to the normal charge existing on the structure. The fact that the corrosion attack of the balls and seats in the pump has been eliminated indicates that such attack was caused by the normal current flow existing prior to the application of this invention.

The fact that there has been no further decline in the production indicates that there has been no further plugging of the liner by either wax or scale, since the well was equipped in accordance with the teachings of this invention.

While I have, for the sake of clearness and in order to disclose the invention so that the same can be readily understood, described and illustrated specific devices and arrangements, I desire to have it understood that this invention is not limited to the specific means disclosed, but may be embodied in other ways that will suggest themselves to persons skilled in the art.

It is believed that this invention is new and all such changes as come within the scope of the appended claims are to be considered as part of this invention.

Having thus described my invention, what I claim and desire to secure by Letters Patent is:

1. A method of effectively neutralizing a first flow of current between first and second oil wells where the first current flow results from a potential difference between the first and second oil wells and where the oil wells have a conductor pipe of a relatively short length, have a surface pipe disposed within the conductor pipe with an increased length relative to that of the conductor pipe and have an oil string disposed within the surface pipe with an increased length relative to that of the surface pipe and where the conductor pipe, the surface pipe and the oil string of each oil well respectively extend at progressive distances into the earth at spaced positions from the conductor pipe, the surface pipe and the oil string of the other oil well, the method consisting of the following steps which may be made while the first and second wells continue in operation:

disposing a plurality of first electrodes into the earth at spaced positions around the first oil well to determine the potential difference between the first oil well and each of the first electrodes and to determine such polarity and the direction of the potential difference between the first and second oil wells, disposing at least one additional electrode between the first and second oil wells at a position substantially along a line defining the direction of the potential difference between the first and second oil wells, connecting a variable resistance between the first oil well and the additional electrode to produce a second flow of current between the first oil well and the additional electrode in a direction opposite to that of the first flow of current, and varying the value of the variable resistance to provide the second flow of current with a magnitude substantially equal to that of the first flow of current to neutralize the flow of current between the first and second wells.

2. The method set forth in claim 1 wherein the additional electrode is extended into the earth to a position of permanent moisture.

3. A method of effectively neutralizing a first flow of current between first and second oil wells each having a conductor pipe of a relatively short length, a surface pipe disposed within the conductor pipe and having an increased length relative to that of the conductor pipe and an oil string disposed within the surface pipe and having an increased length relative to that of the surface pipe where the conductor pipe, the surface pipe and the oil string of each oil well respectively extending at progressive distances into the earth and extending into the earth at respectively spaced positions from the conductor pipe, the surface pipe and the oil string of the other oil well, the method consisting of the following steps which may be made while the first and second wells continue in operation:

disposing a plurality of electrodes into the earth at positions between the first and second oil wells where the electrodes are spaced from the path of the first flow of current between the first and second oil wells in a direction transverse to this path, producing a second flow of current between the electrodes and the first oil well in a direction opposite to that of the first flow of current, and varying the second flow of current between the electrodes and the first oil well to a value which neutralizes the first flow of current from the first oil well.

4. The method set forth in claim 3 wherein the plurality of electrodes are extended into the earth a relatively great distance to positions of permanent moisture.

5. A method of effectively neutralizing a first flow of current between first and second oil wells where the current flow results from a potential difference between the first and second oil wells and where the oil wells have a conductor pipe of a relatively short length, have a surface pipe disposed within the conductor pipe and having an increased length relative to that of the conductor pipe and have an oil string disposed within the surface pipe and having an increased length relative to that of the surface pipe where the conductor pipe, the surface pipe and the oil string of each oil well respectively extend from the conductor pipe, the surface pipe and the oil string of the other well, the method consisting of the following steps which may be made while the first and second wells continue in operation:

disposing a plurality of electrodes into the earth between the first and second oil wells and at positions extending in a transverse direction from the line extending from the first oil well to define the direction of the potential difference between the first and second oil wells, connecting a variable resistance between the electrodes and the first oil well, using the potential difference between the electrodes and the first oil well to generate between the electrodes and the first oil well a second current having a polarity opposite to that of the first current and having a magnitude dependent upon the voltage difference between the electrodes and the first oil well and dependent upon the value of the variable resistance, and varying the value of the variable resistance until the second current is provided with a magnitude substantially equal to that of the first current to neutralize the first flow of current from the first oil well.

6. A method of effectively neutralizing a first flow of current in a main line between first and second oil wells each having a conductor pipe of relatively short length, a surface pipe disposed within the conductor pipe and having an increased length relative to that of the conductor pipe and an oil string disposed within the surface pipe and having an increased length relative to that of the surface pipe where the conductor pipe, the surface pipe and the oil string of each oil well respectively extend at progressive distances into the earth and extend into the earth at respectively spaced positions from the conductor pipe, the surface pipe and the oil string of the other oil well, the method consisting of the following steps which may be made while the first and second wells continue in operation:

disposing a plurality of electrodes into the earth at positions spaced from the first oil well along a second line substantially perpendicular to the main line of current flow between the first and second oil wells, the second line bisecting the main line of current flow between the first and second oil wells, and producing a second flow of current between the plurality of electrodes and the first oil well in a direction opposite to the direction of the first flow of current between the first and second oil wells and with a magnitude substantially equal to the magnitude of the first flow of current between the first and second oil wells to neutralize the first flow of current from the first oil well.

7. A method of effectively neutralizing a first flow of current occurring in a directional line between first and second oil wells and particularly the flow of current between a first position on the first oil well and a second position displaced downwardly along the first oil well at a considerable distance from the first position on the first oil well where the first flow of current enters into the first oil well at the first position and the first current leaves the first oil well at the second position and where the first current flow results from a potential difference between the first and second oil wells and where the oil wells have a conductor pipe of a relatively short length, have a surface pipe disposed within the conductor pipe with an increased length relative to that of the conductor pipe and have an oil string disposed within the surface pipe with an increased length relative to that of the surface pipe and where the conductor pipe, the surface pipe and the oil string of each oil well respectively extend at progressive distances into the earth at spaced positions from the conductor pipe, the surface pipe and the oil string of the other oil well, the method consisting of the following steps which may be made while the first and second wells continue in operation:

disposing an electrode into the earth at a position between the first and second oil wells at a position along substantially the directional line of the first flow of current between the first and second oil wells, connecting the electrode and the first oil well and a variable resistor in an electrical circuit, including the earth between the first and second oil wells, to obtain a second flow of current between the electrode and the first oil well, and varying the value of the variable resistor until the second flow of current is provided with a value substantially equal to that of the first flow of current to obtain a neutralization of the first flow of current in the first oil well.

8. The method set forth in claim 7 wherein the electrode is extended into the earth a relatively great distance to a position of permanent moisture.

9. A method of effectively neutralizing a first flow of current in a directional line between first and second oil wells and particularly the flow of current between a first position on the first oil well and a second position displaced downwardly along the first oil well at a considerable distance from the first position on the first oil well where the first flow of current enters into the first oil well at the first position and the first current leaves the first oil well at the second position and where the first current flow results from a potential difference between the first and second oil wells and where the oil wells have a conductor pipe of a relatively short length, have a surface pipe disposed within the conductor pipe with an increased length relative to that of the conductor pipe and have an oil string disposed within the surface pipe with an increased length relative to that of the surface pipe and where the conductor pipe, the surface pipe and the oil string of each oil well respectively extend at progressive distances into the earth at spaced positions from the conductor pipe, the surface pipe and the oil string of the other oil well, the method consisting of the following steps which may be made while the first and second wells continue in operation:

disposing an electrode into the earth between the first and second oil wells at a position along substantially the directional line of the first flow of current between the first and second oil wells, connecting the electrode and the first oil well and a variable impedance in an electrical circuit with the earth between the first and second oil wells as a source of electrical energy to obtain a second flow of current through the circuit and through the first oil well in a direction opposite to the first flow of current, progressively varying the value of the variable resistor, measuring the potentials produced across the variable impedance by the first and second flows of current through the electrical circuit during the variations in the value of the variable impedance, and discontinuing any further variations in the value of the variable impedance at a measurement indicating a substantial neutralizing of the voltages produced across the variable impedance by the first and second flows of current.

10. A method of effectively neutralizing a first flow of current in a directional line between first and second oil wells and particularly the flow of current between a first position on the first oil well and a second position displaced downwardly along the first oil well at a considerable distance from the first position on the first oil well where the first flow of current enters into the first oil well at the first position and the first current leaves the first oil well at the second position and where the first current flow results from a potential difference between the first and second oil wells and where the oil wells have a conductor pipe of a relatively short length, have a surface pipe disposed within the conductor pipe with an increased length relative to that of the conductor pipe and have an oil string disposed within the surface pipe with an increased length relative to that of the surface pipe and where the conductor pipe, the surface pipe and the oil string of each oil well respectively extend at progressive distances into the earth at spaced positions from the conductor pipe, the surface pipe and the oil string of the other oil well, the method consisting of the following steps which may be made while the first and second wells continue in operation:

disposing an electrode into the earth between the first and second oil wells at a position along substantially the directional line of the first flow of current between the first and second oil wells, connecting the electrode and the first oil well and a variable impedance in an electrical circuit with the earth between the first and second oil wells as a source of electrical energy to obtain a second flow of current through the circuit and through the first oil well in a direction opposite to the first flow of current, progressively varying the value of the variable impedance, measuring the current flowing through the electrical circuit during the variations in the value of the variable impedance, and discontinuning any further variations in the value of the variable impedance at a measurement indicating a substantial neutralizing of the first and second flows of current through the first oil well.

11. The method set forth in claim 10 wherein the electrode is extended into the earth for a relatively great distance to a position of permanent moisture to provide a substantially constant value for the second flow of current over an extended period of time after the discontinuations of any further variations in the value of the variable impedance.

12. A method of effectively neutralizing a first flow of current in a directional line between first and second oil wells and particularly the flow of current between a first position on the first oil well and a second position displaced downwardly along the first oil well at a considerable distance from the first position on the first oil well where the first flow of current enters into the first oil well at the first position and the first current leaves the first oil well at the second position and where the first current flow result from a potential difference between the first and second oil wells and where the oil wells have a conductor pipe of a relatively short length, have a surface pipe disposed within the conductor pipe with an increased length relative to that of the conductor pipe and have an oil string disposed within the surface pipe with an increased length relative to that of the surface pipe and where the conductor pipe, the surface pipe and the oil string of each oil well respectively extend at progressive distances into the earth at spaced positions from the conductor pipe, the surface pipe and the oil string of the other oil well, the method consisting of the following steps which may be made while the first and second wells continue in operation:

disposing at least one electrode into the earth at a position substantially along the directional line of the first flow of current between the first and second oil wells,  producing a second flow of current through the earth between the first oil well and the electrode in a direction opposite to the direction of the first flow of current between the first and second oil wells, and  varying the second flow of current between the anode and the first oil well until the first flow of current through and from the first oil well to the second oil well becomes neutralized.

13. A method of effectively neutralizing a first flow of current between first and second oil wells and particularly the flow of current between a first position on the first oil well and a second position displaced downwardly along the first oil well at a considerable distance from the first position where the first flow of current enters into the first oil well at the first position and the first current leaves the first oil well at the second position and where the first current flow results from a potential difference between the first and second oil wells and where the oil wells have a conductor pipe of a relatively short length, have a surface pipe disposed within the conductor pipe with an increased length relative to that of the conductor pipe and have an oil string disposed within the surface pipe with an increased length relative to that of the surface pipe and where the conductor pipe, the surface pipe and the oil string of each oil well respectively extend at progressive distances into the earth at spaced positions from the conductive pipe, the surface pipe and the oil string of the other oil well, the method consisting of the following steps which may be made while the first and second wells continue in operation:

disposing a plurality of electrodes into the earth at angularly spaced positions around the first oil well,  measuring the potential between the first oil well and each of the electrodes in the plurality to obtain determinations,  from such measured potentials as to the polarity of the potential between the first and second oil wells and the directional line of the current between the first and second oil wells,  disposing at least an additional electrode between the first and second oil wells at a position substantially along the directional line between the first and second oil wells,  connecting the additional electrode and the first oil well and a variable impedance in a circuit which includes the earth between the additional electrode and the first oil well to provide a second flow of current through the earth and the first oil well in a direction opposite to the first flow of current, and  varying the value of the variable impedance until a substantial balance is produced between the first and second flows of current through the first oil well.

14. The method set forth in claim 13 wherein the value of the variable impedance is varied to produce substantially zero potential across the first variable impedance.

15. A method of effectively neutralizing a first potential difference between first and second oil wells where the first potential difference occurs primarily along a particular line between the wells and where the oil wells have a conductor pipe of a relatively short length, have a surface pipe disposed within the conductor pipe with an increased length relative to that of the conductor pipe and have an oil string disposed within the surface pipe with an increased length relative to that of the surface pipe and where the conductor pipe, the surface pipe and the oil string of each oil well respectively extend at progressive distances into the earth at spaced positions from the conductor pipe, the surface pipe and the oil string of the other oil well, the method consisting of the following steps which may be made while the first and second wells continue in operation:

disposing an electrode into the earth between the first and second oil wells at a position substantially along the line defining the direction of the first potential difference between the first and second oil wells,  connecting a variable resistance between the first oil well and the electrode to produce between the first oil well and the electrode a second potential difference in a direction opposite to the first potential difference produced between the first and second oil wells, and  varying the value of the variable resistance until the second potential difference is provided with a magnitude substantially equal to that of the first potential difference to neutralize the first potential difference between the first and second wells.

16. The method set forth in claim 15 wherein the electrode is extended into the earth to a position of permanent moisture.

17. A method of effectively neutralizing a first electrical potential difference between first and second oil wells where the first potential difference occurs primarily along a particular line between the wells and where the oil wells have a conductor pipe of a relatively short length, have a surface pipe disposed within the conductor pipe with an increased length relative to that of the conductor pipe and where the conductor pipe, the surface pipe and the oil string of each oil well respectively extend at progressive distances into the earth at spaced positions from the conductor pipe, the surface pipe and the oil string of the other oil well, the method consisting of the following steps which may be made while the first and second wells continue in operation:

disposing a plurality of electrodes into the earth at positions between the first and second oil wells where the electrodes are spaced on opposite sides of the line of the first potential difference between the first and second oil wells in a direction transverse to this path,  producing a second potential difference between the electrodes and the first oil well in a direction opposite to that of the first potential difference between the first and second oil wells, and  varying the second potential difference between the electrodes and the first oil well to a value which neutralizes the first potential difference between the first and second oil walls.

18. The method set forth in claim 17 wherein the plurality of electrodes are extended into the earth a relatively great distance to positions of permanent moisture.

References Cited by the Examiner

UNITED STATES PATENTS

| | | | |
|---|---|---|---|
| 792,025 | 6/1905 | Hamilton | 324—72 |
| 2,053,214 | 9/1936 | Brown | 204—196 |
| 2,190,322 | 2/1940 | Potapenko | 204—195 |
| 2,360,244 | 10/1944 | McAnneny | 204—147 |
| 2,371,658 | 3/1945 | Stewart | 204—195 |
| 2,584,623 | 2/1952 | Schneider | 204—147 |
| 2,782,370 | 2/1957 | VerNooy | 324—72 |

(Other references on following page)

UNITED STATES PATENTS 2,803,797   8/1957   Cowles _____________ 204—195
2,875,142   2/1959   Landers et al. _______ 204—147

OTHER REFERENCES

Applegate: "Cathodic Protection," 1960, pages 12–14.
Nelson: "Cathodic Protection, a Symposium," 1949, pages 66–69.
Parker: "Pipe Line Corrosion and Cathodic Protection," 1954 pages 68–73.
Romanoff: "Underground Corrosion," NBS Circular 579, pp. 180–184 and 194, April 1957.

JOHN H. MACK, *Primary Examiner.*

JOSEPH REBOLD, JOHN R. SPECK, MURRAY TILLMAN, WINSTON A. DOUGLAS, *Examiners.*